United States Patent [19]

Hata et al.

[11] Patent Number: 5,351,076
[45] Date of Patent: Sep. 27, 1994

[54] TERMINAL SYSTEM HAVING VIDEO TELEPHONE EQUIPMENT COOPERATING WITH COMPUTER SYSTEM

[75] Inventors: Masahiro Hata; Teruo Tobe; Hiroshi Oki, all of Kawasaki, Japan

[73] Assignee: Fujitsu Limited, Kawasaki, Japan

[21] Appl. No.: 925,924

[22] Filed: Aug. 7, 1992

[30] Foreign Application Priority Data

Aug. 9, 1991 [JP] Japan .................. 3-225096

[51] Int. Cl.⁵ .......................................... H04M 11/00
[52] U.S. Cl. .......................................... 348/14; 379/96
[58] Field of Search .................. 379/53, 54, 93, 96-98, 379/90, 354-356; 358/85; 348/14-16; H04N 7/10, 7/12, 7/14

[56] References Cited

U.S. PATENT DOCUMENTS

| | | | |
|---|---|---|---|
| 4,640,989 | 2/1987 | Riner et al. | 379/96 |
| 4,805,211 | 2/1989 | Brennan et al. | 379/355 |
| 4,882,750 | 11/1989 | Henderson et al. | 379/355 |
| 4,893,326 | 1/1990 | Duran et al. | 379/53 |
| 5,003,580 | 3/1991 | Duong et al. | 379/96 |
| 5,056,136 | 10/1991 | Smith | 379/53 |
| 5,062,132 | 10/1991 | Yasuda et al. | 379/355 |
| 5,062,136 | 10/1991 | Gattis et al. | 358/85 |

FOREIGN PATENT DOCUMENTS

| | | |
|---|---|---|
| 2-90190 | 3/1990 | Japan . |
| 2-104080 | 4/1990 | Japan ................ 379/53 |
| 2-260755 | 10/1990 | Japan ................ 379/53 |
| 3-162186 | 7/1991 | Japan . |

Primary Examiner—Wing F. Chan
Attorney, Agent, or Firm—Armstrong, Westerman, Hattori, McLeland & Naughton

[57] ABSTRACT

A terminal system having a video telephone equipment and a computer system. The video telephone equipment includes a communication unit connected to a line; a telephone unit for communicating with a remote station by speech via the communication unit and the line; and a camera unit for taking pictures and outputting video signals corresponding to the pictures. The video signals are transmitted to the remote station via the communication unit and the line. The video telephone equipment further includes a display unit for displaying images; and a processor for controlling the communication unit, the telephone unit, the camera unit and the display unit. The communication unit, the telephone unit, the camera unit, the display unit and the processor unit are coupled to each other by a first bus. The computer system includes a processor, coupled to an external unit by a second bus, for processing data supplied thereto via the second bus. The terminal system includes an interface circuit, coupled to the first and second buses, for intermediating between the video telephone equipment and the computer system so that data is transmitted from the computer system to the video telephone equipment via the interface means and vice versa.

11 Claims, 20 Drawing Sheets

FIG. 10

(a) PICTURE ON PC

- ☐ FILE COMM.
- ☐ TELEPHONE NUMBER
- ☐ TEXT DISPLAY
- ☐ SUPPLEMENTATION

(b) PICTURE ON VIDIO TEL.

| OTHER PERSON'S FACE | |
| --- | --- |
| | OWN FACE |
| [ICON] → | [PC] • AUTO DIAL • IMAGE • OTHER |

(c) COMPOSITE IMAGE

| OTHER PERSON'S FACE | |
| --- | --- |
| | OWN FACE |
| [ICON] → | [PC] • AUTO DIAL • IMAGE |

F I G. 11

(a) PICTURE ON PC

- ■ FILE COMM.
- ☐ TELEPHONE NUMBER
- ☐ TEXT DISPLAY
- ☐ SUPPLEMENTATION (b) PICTURE ON VIDIO TEL.

| OTHER PERSON'S FACE | |
|---|---|
| | OWN FACE |
| [ICON] → | · PC<br>· AUTO DIAL<br>· IMAGE<br>· OTHER |

(c) COMPOSITE IMAGE

| OTHER PERSON'S FACE | |
|---|---|
| | OWN FACE |
| ☐ FILE COMM.<br>☐ TELEPHONE NUMBER<br>☐ TEXT DISPLAY<br>☐ SUPPLEMENTATION | · PC<br>· AUTO DIAL<br>· IMAGE |

F I G. 1 2

(a) PICTURE ON PC

NS FILE COMM.
■ TEXT DATA
☐ BINARY DATA
☐ OASIS DATA (b) PICTURE ON VIDIO TEL.

| OTHER PERSON'S FACE | |
| --- | --- |
| [ICON] → | OWN FACE |
| | • PC<br>• AUTO DIAL<br>• IMAGE<br>• OTHER |

(c) COMPOSITE IMAGE

| NS FILE COMM.<br>■ TEXT DATA<br>☐ BINARY DATA<br>☐ OASIS DATA | OTHER PERSON'S FACE |
| --- | --- |
| | OWN FACE |
| | • PC<br>• AUTO DIAL<br>• IMAGE |

FIG. 13

(a) PICTURE ON PC

NS FILE COMM.
■ FILE TRANSMISSION
☐ SET STORAGE FOR RECEIVED FILE
☐ OASYS DATA

(b) PICTURE ON VIDIO TEL.

| OTHER PERSON'S FACE | OWN FACE |
|---|---|
| [ICON] → | · PC<br>· AUTO DIAL<br>· IMAGE<br>· OTHER |

(c) COMPOSITE IMAGE

| NS FILE COMM.<br>■ FILE TRANSMISSION<br>☐ SET STORAGE FOR RECEIVED FILE<br>☐ OASIS DATA | OTHER PERSON'S FACE |
|---|---|
| | OWN FACE |
| | · PC<br>· AUTO DIAL<br>· IMAGE |

FIG. 20

|  |  | NAME | TEL No. | COMMENTS |
|---|---|---|---|---|
| 10-a | a b c d e f g h i j | FUJITSU<br><br>10-a1 | 044-777-1111<br><br>10-a2 | 10-a3 |
| 10-b | あ い う ⋮ ん | 10-b1 | 10-b2 | 10-b3 |

TERMINAL SYSTEM HAVING VIDEO TELEPHONE EQUIPMENT COOPERATING WITH COMPUTER SYSTEM

BACKGROUND OF THE INVENTION

1. Field of the invention

The present invention generally relates to a terminal system having a video telephone equipment cooperating with a computer system such as a personal computer (PC), and more particularly to a terminal system having a video telephone equipment cooperating with a computer system, which simultaneously communicates dynamic/static images and sounds to those in remote stations so that remote audio and video communications are performed.

2. Description related art

FIG. 1 shows a conventional video telephone system. In FIG. 1, stations A and B are provided with video telephone equipments 100 which are coupled to each other by an ISDN line. Each of the video telephone equipments 100 has a controller 110 with a processor, a telephone unit 3, a display unit 4 and a TV camera unit 5. The telephone unit 3, the display unit 4 and the TV camera unit 5 are coupled to the controller 110 so as to be controlled thereby. When each of the video telephone equipments 100 in the stations A and B receives audio signals and image signals transmitted from the other party station, the audio signals and the image signals are respectively converted into sounds and visualized images by telephone unit 3 and the display unit 4 controlled by the controller 110. Voices and images of a speaker are respectively converted into audio signals and image signals by the telephone unit 3 and the TV camera unit 5 controlled by the controller 5 and are transmitted to the other party station.

Each of the video telephone equipment 100 is constituted as shown in, for example, FIG. 2.

Referring to FIG. 2, the controller 100 has a processor 2 (MPU), a memory 13, a communication unit 15 and an image display controller 19, and these parts of the controller 100 are coupled to each other by a processor bus 7. The display unit 4 (CRT) and the TV camera unit 5 are connected to the image display controller 19, and the telephone unit 3 is connected to the communication unit 15 which is connected to the telecommunication line (the ISDN line).

The processor 2 is a micro-processor, and the memory 13 is formed of a RAM (Random Access Memory), a ROM (Read Only Memory) and the like. The communication unit 15 intermediates between the telecommunication line and the telephone unit 3 and between the processor bus 7 and the telecommunication line in accordance with instructions from the processor 2. The image display controller 19 controls the display unit 4 and the TV camera unit 5 in accordance with instructions supplied from the processor 2 via the processor bus 7. The TV camera unit 5 takes pictures and outputs image signals corresponding to the pictures. Dynamic image signals or static image signals are generated, by the image display controller 19, based on the output signals of the TV camera unit 5. The dynamic image signals or the static image signals are output to the telecommunication line and transmitted to the other party station via the telecommunication line. When the dynamic image signals or the static image signals transmitted from the other party station is received by the video telephone equipment 100, the display unit 4 displays images corresponding to the dynamic image signals or the static image signals.

The telephone unit 3 is constituted by a handset 3-3 and a telephone body 3-4. The handset 3-3 is connected to the communication unit 15 of the controller 2 via the telephone body 3-4. The handset 3-3 converts the voice of the speaker into audio signals and the audio signals are supplied to the telecommunication line via the telephone body 3-4 and the communication unit 15. The handset 3-3 also outputs sound corresponding to audio signals supplied from the telecommunication line via the communication unit 15 and the telephone body 3-4. The telephone body 3-4 selects a link used for communication and intermediates between the handset 3-3 and the communication unit 15. In the telephone body 3-4, a dialing operation to call the other party station is carried out using ten-keys or a function key specifying the other party station. Then the link is selected and the communication can be carried out with other party station via the handset 3-3.

In the video telephone system described above, the voice of the speaker is converted into audio signals by the telephone unit 3, the audio signal is transmitted from the controller 2 to that in the other party station via the telecommunication line (the ISDN line). In the other party station, the audio signal received by the controller 2 is converted into sound by the telephone unit 3. In addition, dynamic image signals or static signals corresponding to pictures taken by the TV camera unit 5 are transmitted from the controller 2 to that in the other party station along with the above audio signal via the telecommunication line. In the other party station, images corresponding to the dynamic signals or the static signals received by the controller 2 are displayed by the display unit 4.

Each of the conventional video telephone equipments 100 described above is not coupled to a computer system such as a personal computer (PC). Thus, data processed in the computer system cannot be transmitted to the remote station by utilizing the video telephone equipment 100. In addition, composite images composed of images corresponding to data processed in the computer system and images corresponding to image signals processed in the video telephone equipment cannot be obtained.

SUMMARY OF THE INVENTION

Accordingly, a general object of the present invention is to provide a novel and useful terminal system having a video telephone equipment cooperating with a computer system, in which the disadvantages of the aforementioned prior art are eliminated.

A more specific object of the present invention is to provide a terminal system having a video telephone equipment capable of transmitting data processed in a computer system to remote stations.

The above objects of the present invention are achieved by a terminal system having a video telephone equipment and a computer system, the video telephone equipment comprising: a communication unit connected to a line; a telephone unit for communicating with a remote station by speech via the communication unit and the line; a camera unit for taking pictures and outputting video signals corresponding to the pictures, the video signals being transmitted to the remote station via the communication unit and the line; a display unit for displaying images corresponding to video signals;

and a processor for controlling the communication unit, the telephone unit, the camera unit and the display unit, wherein the communication unit, the telephone unit, the camera unit, the display unit and the processor unit are coupled to each other by a first bus, the computer system comprising: a processor, coupled to an external unit by a second bus, for processing data supplied thereto via the second bus, and the terminal system comprising: interface means, coupled to the first and second buses, for intermediating between the video telephone equipment and the computer system so that data is transmitted from the computer system to the video telephone equipment via the interface means and viceversa.

Another object of the present invention is to provide a video telephone equipment capable of obtaining composite images composed of images corresponding to data processed in a computer system and images corresponding to image signals processed in the video telephone equipment.

The above objects of the present invention are achieved by the terminal system further comprising composite image forming means for forming a composite image composed of a first image obtained in the video telephone equipment and a second image obtained in the computer system, the composite image being supplied to the display unit of the video telephone equipment and displayed thereon.

According to the present invention, the first bus of the video telephone equipment and the second bus of the computer system are connected to each other by the interface means, so that data processed in the computer system can be transmitted to a remote station by the video telephone equipment. In addition, due to the composite image forming means, composite images composed of images corresponding to data processed in a computer system and images corresponding to image signals processed in the video telephone equipment can be obtained.

Additional objects, features and advantages of the present invention will become apparent from the following detailed description when read in conjunction with the accompanying drawings.

BRIEF DESCRIPTION OF THE DRAWINGS

FIGS. 10, 11, 12 and 13 are diagrams illustrating images displayed on a display unit of the personal computer, images displayed on a display unit of the video telephone equipment and composite images thereof.

FIG. 20 is a diagram illustrating a table provided with a portable computer connected to the video telephone equipment.

DESCRIPTION OF THE PREFERRED EMBODIMENTS

A description will now be given of a principle of an embodiment of the present invention with reference to FIG. 3.

Figure 1:
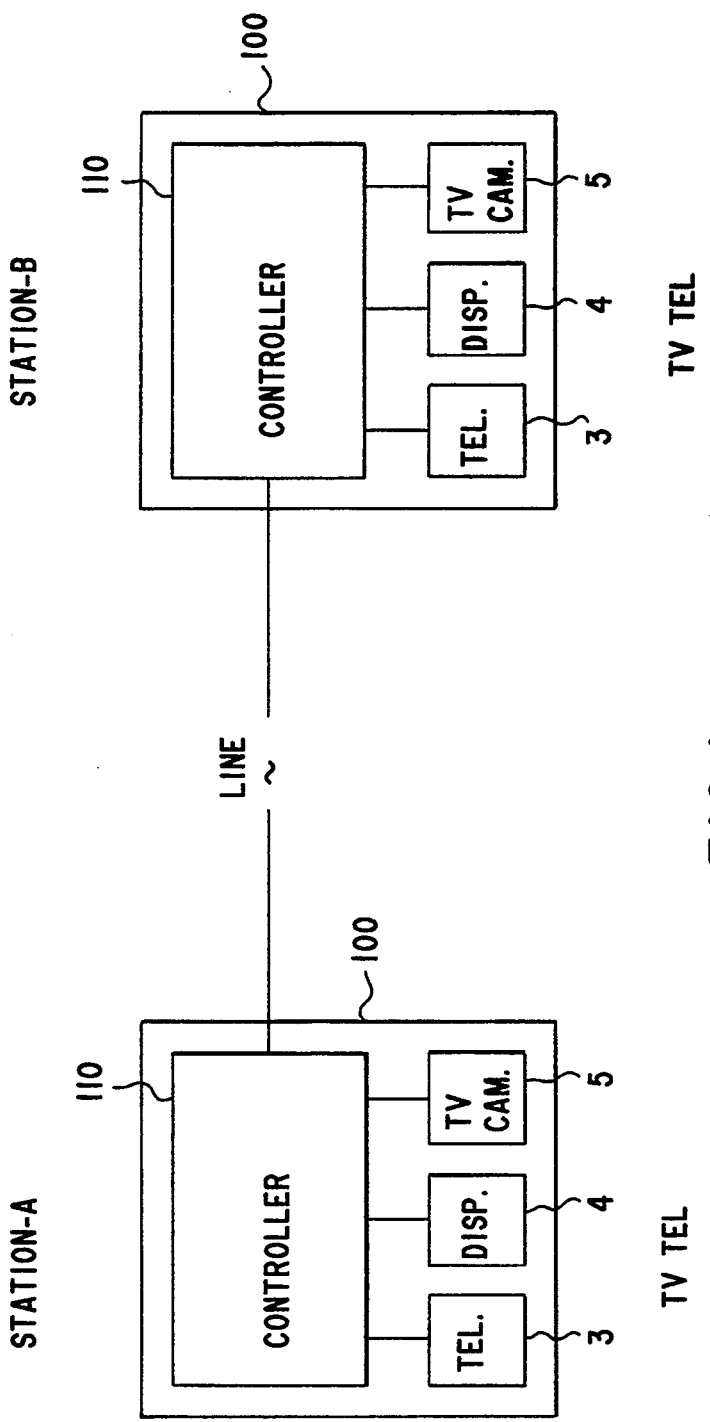
FIG. 1 is a block diagram illustrating a video telephone system.
Figure 2:
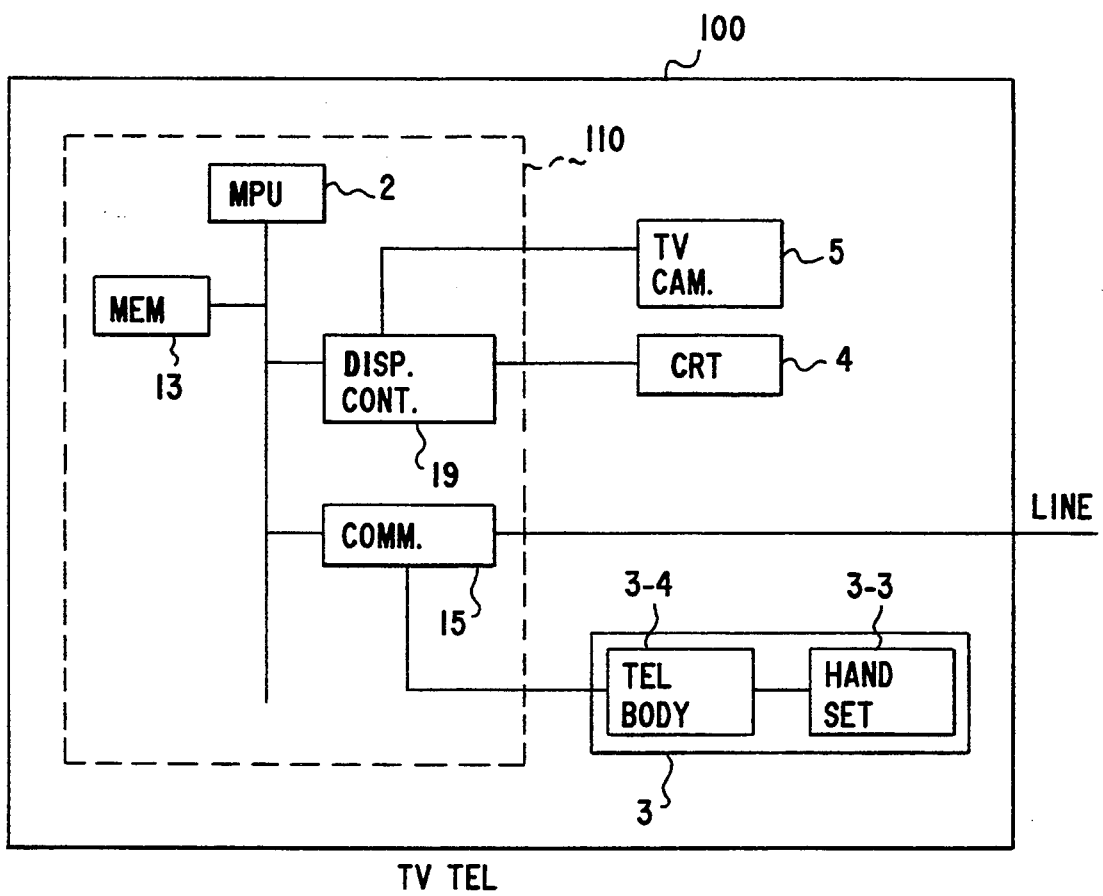
FIG. 2 is a block diagram illustrating a conventional video telephone equipment.
Figure 3:
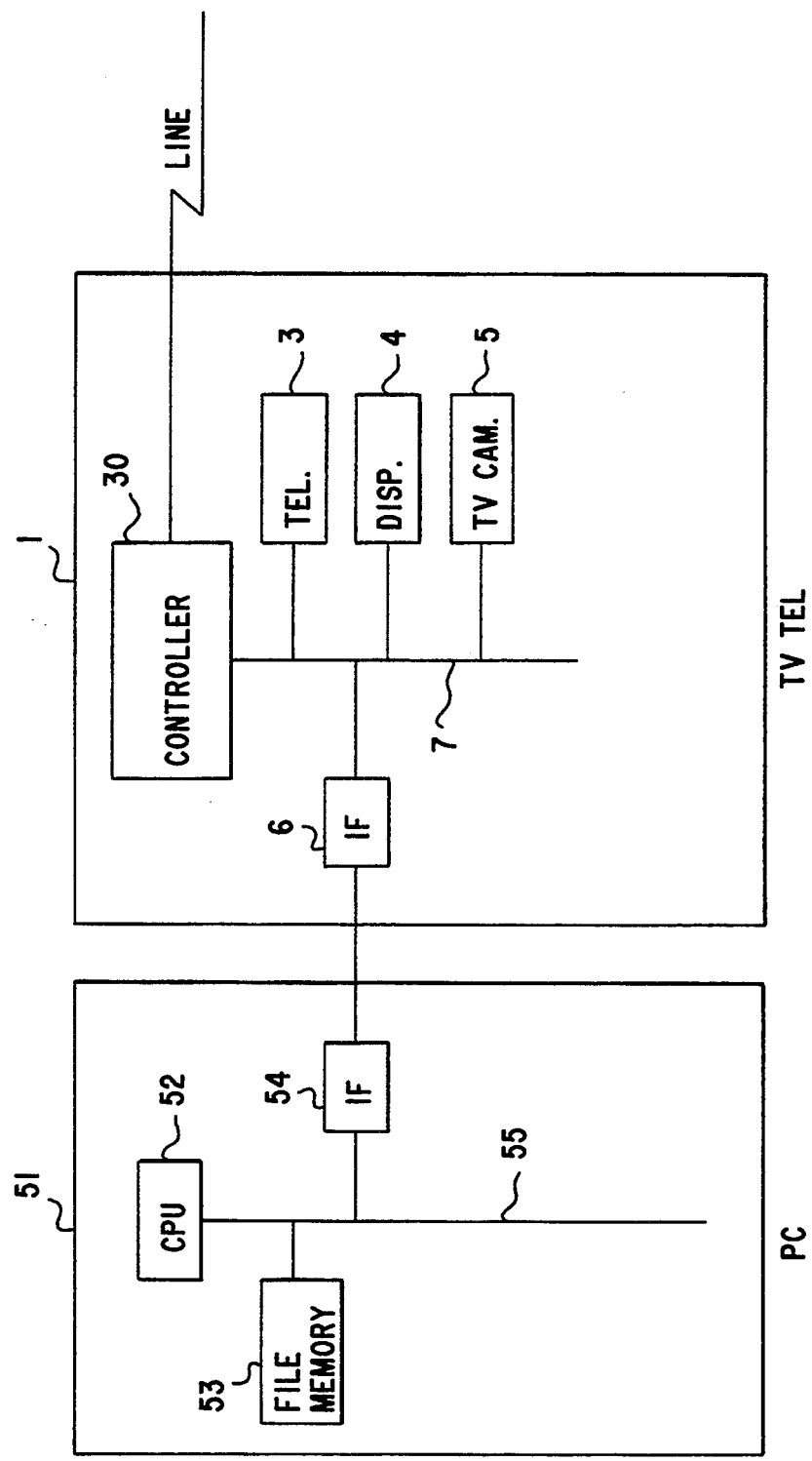
FIGS. 3 and 4 are block diagrams illustrating principles of embodiments of the present invention.

Referring to FIG. 3, a video telephone equipment 1 (TV TEL) has a controller 30 with a processor, a telephone unit 3, a display unit 4 and a TV camera unit 5. The controller 30 is connected to the telephone unit 3, the display unit 4 and the TV camera unit 5 by a processor bus 7 so as to control them. Various data are supplied from the controller 30 to the telephone unit 3, the display unit 4 and the TV camera unit 5 via the processor bus 7 and viceversa. A personal computer 51 (PC) has a processor 52 and a file 53 connected to the processor 52 by a processor bus 55. File data is supplied from the processor 52 to the file 53 and viceversa.

The video telephone equipment 1 is provided with a first interface circuit 6 connected to the processor bus 7. The personal computer 51 is provided with a second interface circuit 54 connected to the processor bus 55. The first and second interface circuits 6 and 54 are connected to each other so that various data can be transmitted from the processor bus 7 of the video telephone equipment 1 to the processor bus 55 of the personal computer 51 via the first and second interface circuits 6 and 54 and viceversa. Thus, file data stored in the file memory 53 of the personal computer 51 can be supplied to the controller 30 of the video telephone equipment 1 via the processor bus 55, the second and first interface circuits 54 and 6 and the processor bus 7. The file data received in the video telephone equipment 1 is transmitted from the controller 30 to a remote station via a telecommunication line (the ISDN line).

A description will now be given of another principle of an embodiment of the present invention with reference to FIG. 4.

Figure 4:
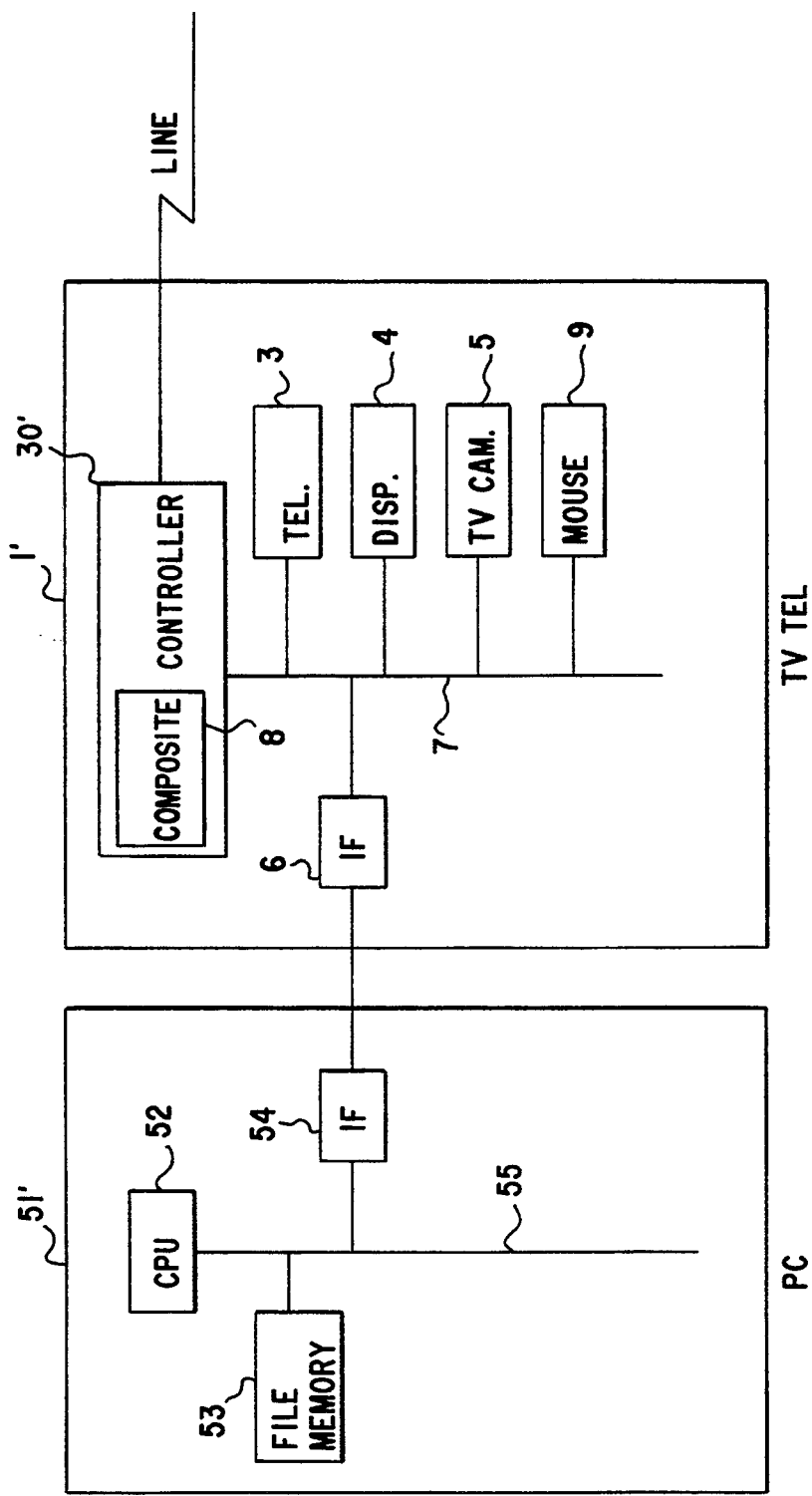

Referring to FIG. 4, a video telephone equipment 1' (TV TEL) has a controller 30' with a processor, the telephone unit 3, the display unit 4, the TV camera unit 5, a mouse 9 (an input device) and the first interface circuit 6 which elements are connected to each other by the processor bus 7. A personal computer 51' (PC) has the processor 52, the file memory 53, the second interface 54 and the processor bus 55 in the same manner as the personal computer 51 shown in FIG. 3. The first and second interface circuits 6 and 54 are connected to each other. The controller 30' in the video telephone equipment 1' is provided with a composite image forming unit 8.

Data processed in the personal computer 51' can be transmitted to the video telephone equipment 1' via the second interface circuit 54 and the first interface circuit 6. The composite image made by the composite image forming unit 8 of the controller 30' is displayed on the display unit 4.

Operation data representing operating instructions is input, by the mouse 9, to the video telephone equipment 1. The controller 30' controls the display unit 4 in accordance with the operation data input by the mouse 9 so that an instruction mark is displayed thereon. The operation data input by the mouse 9 can be also transmitted to the personal computer 51' via the first and second interface circuits 6 and 54, so that the personal computer 51' can be operated by the mouse 9 of the video telephone equipment 1'.

The file data stored in the file memory 53 of the personal computer 51' can be supplied to the controller 30' of the video telephone equipment 1' via the processor bus 55, the second and first interface circuits 54 and 6 and the processor bus 7, in the same manner as that in a case shown in FIG. 3.

A description will now be given of a first embodiment of the present invention with reference to FIGS. 5 through 13.

Figure 5:
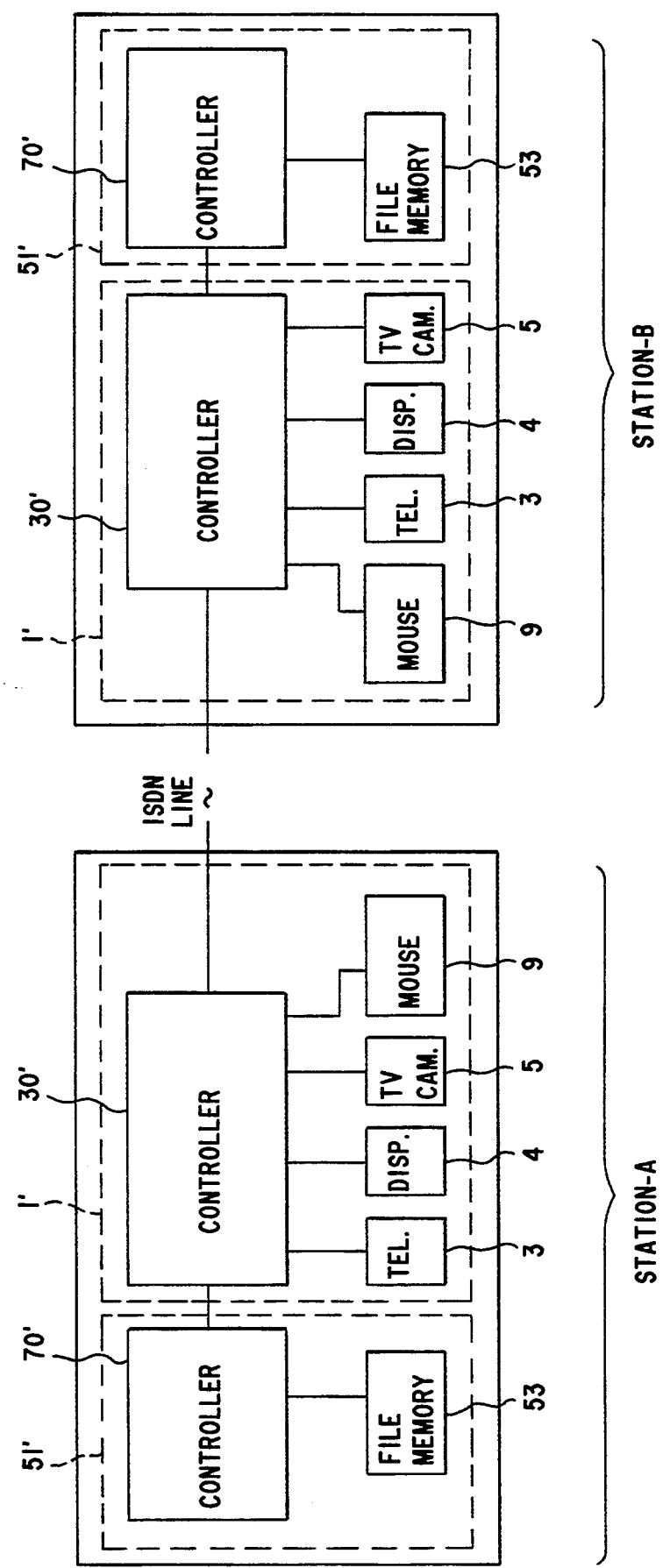
FIG. 5 is a block diagrams illustrating a video telephone system according to a first embodiment of the present invention.

Referring to FIG. 5 which shows a video telephone system in stations A and B, each of the stations A and B is provided with the video telephone equipment 1' and the personal computer 51' which are coupled to each other. The video telephone equipments 1' and 1' in the stations A and B are connected to each other by an ISDN line (a telecommunication line). The video telephone equipment 1' has the controller 30' with a processor, the telephone unit 3, the display unit 4, the TV camera unit 5 and the mouse 9. The controller 30' receives the operation data input from the mouse 9 and controls the telephone unit 3, the display unit 4 and the TV camera unit 5. The personal computer 51' has the controller 70' with a processor and the file memory 53.

Figure 6:
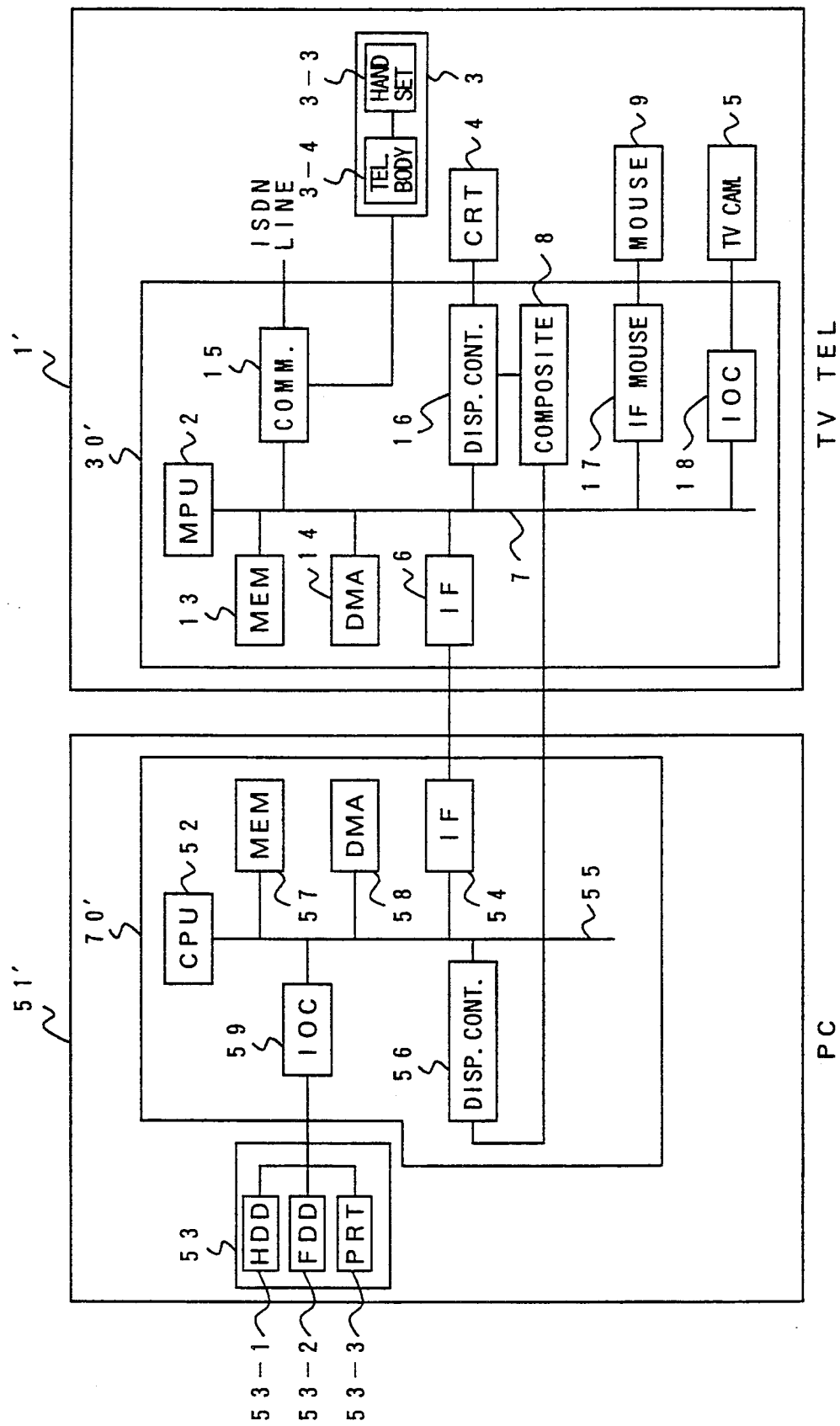
FIG. 6 is a block diagram illustrating a personal computer (PC) and a video telephone equipment (TV TEL) provided in each station in the video telephone system shown in FIG. 5.

Detailed structures of the video telephone equipment 1' and the personal computer 51' are shown in FIG. 6.

Referring to FIG. 6, the controller 30' has the processor 2 (MPU), the first interface circuit 6, the memory 13, a DMA (Direct Memory Access) controller 14, the communication unit 15, a display control unit 16, the composite image forming unit 8, a mouse interface circuit 17 and an input/output interface circuit 18 (IOC). These parts in the controller 30' are connected to each other by the processor bus 7. The communication unit 15 is further connected to the ISDN line and the telephone unit 3 comprising the handset 3-3 and the telephone body 3-4 so as to intermediate between the processor bus 7 and the ISDN line and between the telephone unit 3 and the ISDN line. The display unit 4 is connected to the display control unit 16, and the TV camera unit 5 is connected to the input/output interface circuit 18 (IOC). The mouse 9 is connected to the mouse interface circuit 17. When the mouse 9 is operated, operation data is output therefrom. The operation data output from the mouse 9 is supplied to the processor bus 7 via the mouse interface circuit 17. A mark displayed on the display unit 4 on which various icons are displayed is moved in accordance with the operation data from the mouse 9, and one of the icons pointed by the mark is selected.

The controller 70' of the personal computer 51' has the processor 52, the second interface circuit 54, a display controller 56, a memory 57, a DMA controller 58 and an input/output interface circuit 59 which are coupled to each other by the processor bus 55. The second interface circuit 54 is connected to the first interface circuit 6 of the video telephone equipment 1' so that various data is supplied from the personal computer 51' to the video telephone equipment 1' via the second and first interface circuit 54 and 6 and viceversa. The display controller 56 is connected to the composite image forming unit 8 so that a video signal is supplied from the display controller 56 to the composite image forming unit 8 of the video telephone equipment 1'. The file memory 53 has a hard disk unit 53-1 (HDD), a floppy disk unit 53-2 (FDD) and a printer 53-3 (PRT).

Figure 7:
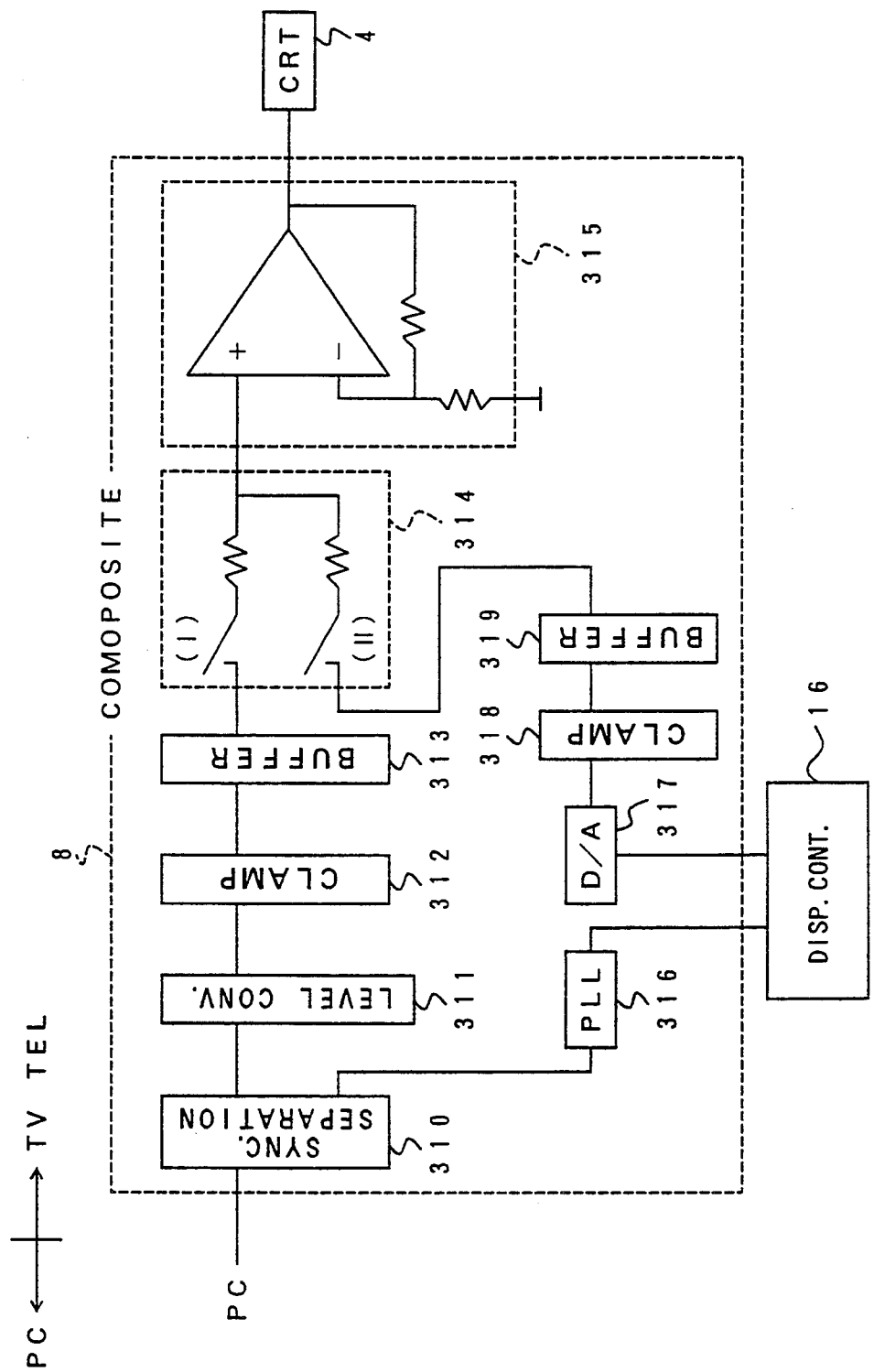
FIG. 7 is a block diagram illustrating an image composing circuit provided in a controller of the video telephone equipment.

The composite image forming unit 8 of the video telephone equipment 1' is constituted as shown in FIG. 7.

Referring to FIG. 7, the composite image forming unit 8 has a synchronous separation circuit 310, a level converter 311, a first clamper 312, a first buffer 313, a switching circuit 314, an amplifier 315, a PLL (Phase-Locked Loop) 316, a digital-to-analog converter 317, a second clamper 318 and a second buffer 319. The synchronous separation circuit 310 separates a synchronous signal from the video signal transmitted from the personal computer 51'. The switching circuit 314 has a first path (I) and a second path (II), the video signal (an analog RGB signal) transmitted from the display controller 56 of the personal computer 51' is supplied to the first path (I) of the switching circuit 314. The signal output from the synchronous separation circuit 310 is supplied to the PLL 316, so that a phase of a clock signal is locked at the phase of the signal from the synchronous separation circuit 310, and the clock signal is supplied to the display controller 16. The display controller 16 outputs image data processed in the video telephone equipment 1' in synchronism with the clock signal supplied from the PLL 316. The image data output from the display controller 16 is converted into an analog signal. The analog signal output from the digital-to-analog converter 317 is supplied to the second path (II) of the switching circuit 314. The switching circuit 314 is controlled so that the first path (I) and the second path (II) are turned on or off dot by dot. As a result, a composite image signal composed of the video signal supplied from the personal computer 51' and the signal corresponding to the image data processed in the video telephone equipment 1' is output from the switching circuit 314. The composite signal is supplied to the display unit 4 via the amplifier 315, so that an image corresponding to the composite signal is displayed on the display unit 4.

The video signals corresponding to icons indicating processes enabled in the personal computer 51' are supplied from the personal computer 51' to the composite image forming unit 8. Then, the signals corresponding to icons indicating processes enabled in the video telephone equipment 1' and the above video signals supplied from the personal computer 51' are composed into a composite image signal by the composite image forming unit 8. As a result, the icons indicating the processes enabled in both the personal computer 51' and the video telephone equipment 1' are displayed on the display unit 4. In this case, due to the operation of only the mouse 9 for pointing one of the icons displayed on the display unit 4, the processes in both the personal computer 51' and the video telephone equipment 1' can be identified.

Figure 8:
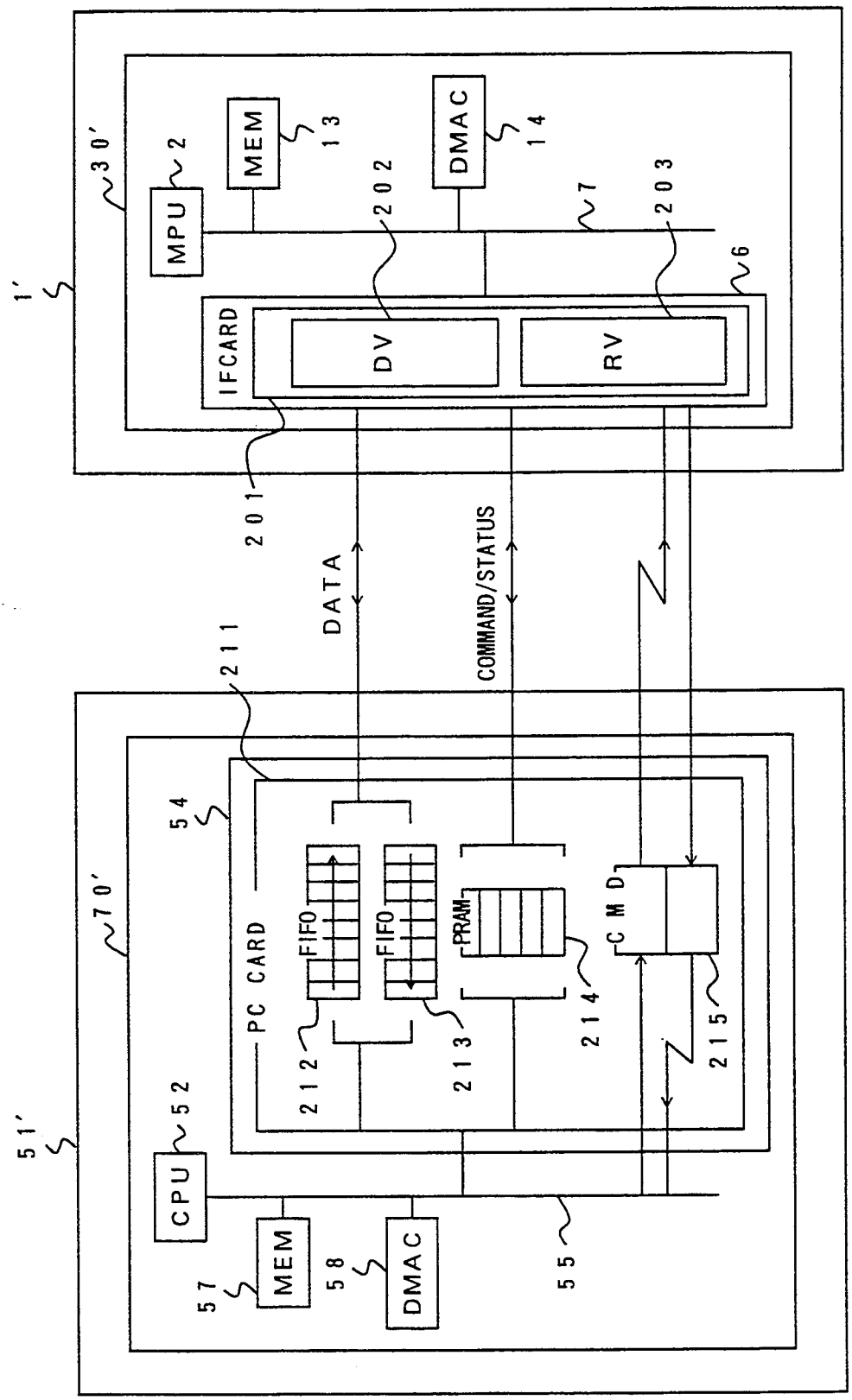
FIG. 8 is a block diagram illustrating interface circuits provided in the personal computer and the video telephone equipment.

The first interface circuit provided in the controller 30' of the video telephone equipment 1' and the second interface circuit provided in the controller 70' of the personal computer 1' are constituted as shown in FIG. 8.

Referring to FIG. 8, the first interface circuit 6 has a driver 202 and a receiver 203, and formed on an IF card. The second interface circuit 54 has a first FIFO (First-in First-out memory) 212, a second FIFO 213, a PRAM 214 and a CMD 215, and formed on a PC cooperating card. The IF card is set in the video telephone equipment 1' and the PC cooperating card is set in the personal computer 51', so that the processor bus 7 of the video telephone equipment 1' and the processor bus 55 of the personal computer 51' are coupled via the first and second interface circuits 6 and 54. The data, such as file data from the file 53, is set in the first FIFO 212 of the second interface circuit 54. The data output from the FIFO 212 is received by the receiver 203 of the first interface circuit 6. The data, such as the operation data output from the mouse 9, which is in the processor bus 7 of the video telephone equipment 1' is transmitted from the driver 202 of the first interface circuit 6 to the second interface circuit 54 of the personal computer 51'. The data received by the second interface circuit 54 is supplied to the processor bus 55 of the personal computer 51' via the second FIFO 213. Various commands and statuses are transmitted from the personal computer 51' to the video telephone equipment 1' and viceversa by using the PRAM 214 in the second interface circuit 54 of the personal computer 51' and the first interface circuit 6 of the video telephone equipment 1'. The CMD 215 is used for transmitting interrupt signals from the video telephone equipment 1' to the personal computer 51' and viceversa.

Figure 9:
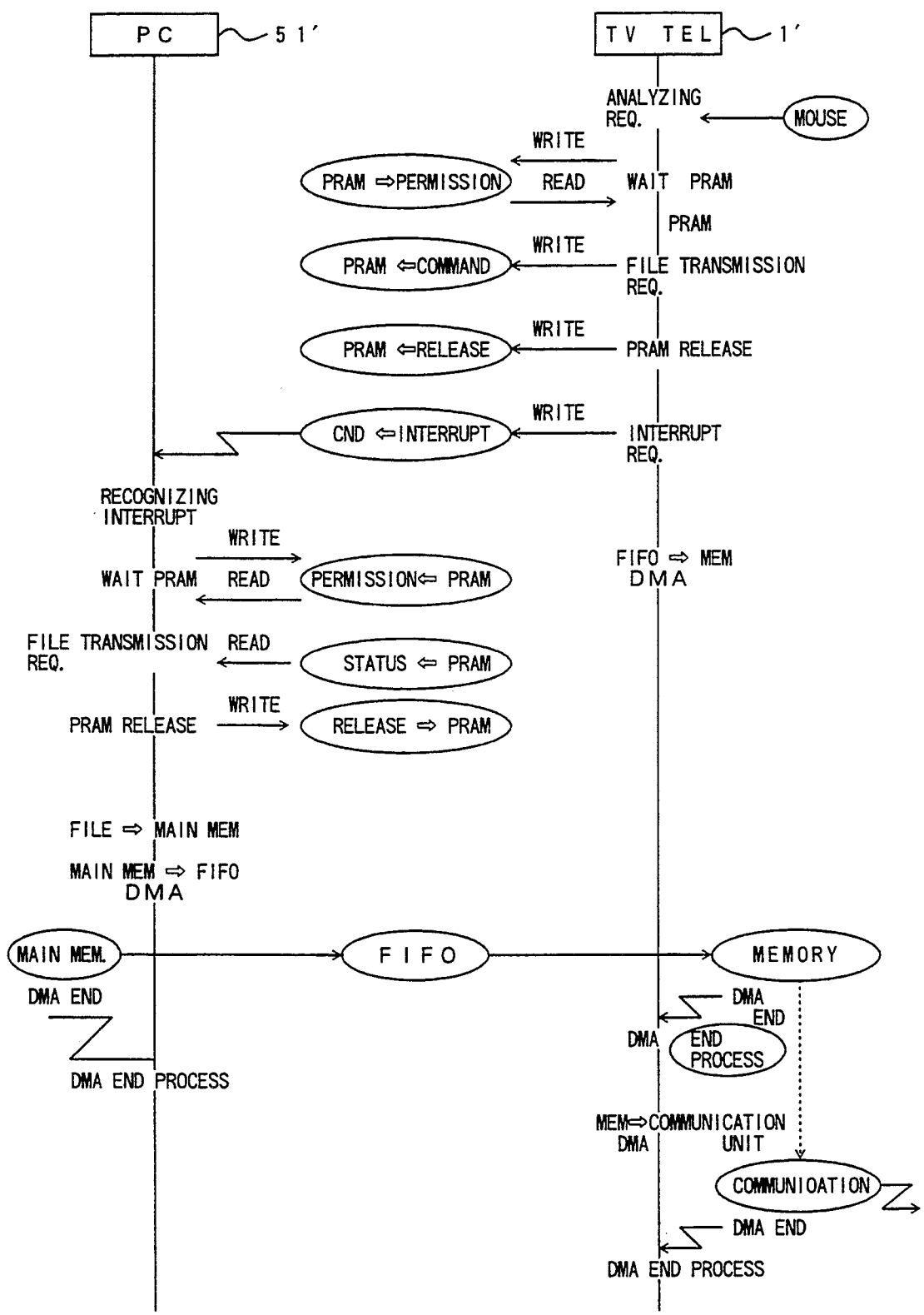
FIG. 9 is a timing chart illustrating procedures executed by the personal computer and the telephone equipment in a case where a file in the personal computer is transmitted from the video telephone unit to a remote station.

A process for transmitting file data stored in the floppy disk unit 53-2 of the personal computer 51' from the video telephone equipment 1' to the remote station is carried out in accordance with a procedure shown in, for example, FIG. 9.

Referring to FIG. 9, when a "FILE TRANSMISSION" mode is selected by the mouse 9 on the display unit 4, the controller 30' (the processor 2) of the video telephone equipment 1' analyzes a mode selected by the mouse 9 and starts to prepare to request a file to the personal computer 51'. After that, the controller 30' asks the second interface circuit 54 of the personal computer 51' permission of use of the PRAM 214, and waits for the PRAM 214 to become able to be occupied. When the occupation of the PRAM 214 is permitted, the controller 30' of the video telephone equipment 1' writes a request command for transmitting the file in the PRAM 214 under a condition of the occupation of the PRAM 214. After writing the request command in the PRAM 214, the PRAM 214 is released from the occupation caused by the video telephone equipment 1'. Then, the controller 30' of the video telephone equipment 1' supplies an interrupt request to the CMD 215 of the second interface circuit 54 of the personal computer 51'. When the processor 52 of the personal computer 51' recognizes the interrupt request in the CMD 215 of the second interface circuit 54, the processor asks the PRAM 214 permission thereof and waits for the PRAM 214 to become able to be occupied. When the occupation of the PRAM 214 is permitted, the processor 52 reads the request command (for transmitting the file) stored in the PRAM 214. After that, the PRAM 214 is released from the occupation. When the processor recognizes the request command for transmitting the file, the file is read out from the floppy disk unit 53-2 and loaded into the memory 57 (a main memory). Then the file is transmitted from the memory 57 to the FIFO 212 by use of a DMA (Direct Memory Access) transmission controlled by the DMA controller 58 (DMAC).

In the video telephone equipment 1', after supplying the interrupt request to the CDM 215 of the second interface circuit 54, a DMA transmission from the FIFO 212 in the second interface circuit 54 of the personal computer 51' to the memory 13 in the video telephone equipment 1' is being activated by the DMA controller 14 (DMAC), and the video telephone equipment 1' is waiting for the file to be loaded in the FIFO 212. In this state, after the file is loaded in the FIFO 212 by use of the DMA transmission, interrupt commands (DMA END) for ending the DMA transmission are activated in both the personal computer 51' and the video telephone equipment 1', and the file is transmitted from the FIFO 212 to the memory 13 of the video telephone equipment 1'. Then, the file stored in the memory 13 is transmitted to the communication unit 15 by use of the DMA transmission controlled by the DMA controller 14. The communication unit 15 controls the telephone unit 3 so that the file is transmitted to the remote station. After all the file is transmitted to the remote station, the DMA transmission from the memory 13 to the communication unit 15 is completed.

Various data, commands and statuses can be transmitted from the video telephone equipment 1' to the personal computer 51' via the first and the second interface circuits 6 and 54 and viceversa, in the same manner as the file described above.

When a conversation is carried out between video telephone equipments, the file in the personal computer is transmitted from a video telephone equipment to the other video telephone equipment in accordance with the following procedure.

A conversation software is activated in the personal computer 51', the video telephone equipment 1' coupled to the personal computer 51' calls the other video telephone equipment in the remote station by using the telephone unit 3, and the ISDN line is connected to both the video telephone equipments so that a communication can be performed between them. In this state, display information in the personal computer 51' as shown in FIG. 10(a) is not integrated with display information in the video telephone equipment 1' as shown in FIG. 10(b). Thus, only the display information in the video telephone equipment 1' is displayed on the display unit 4, as shown in FIG. 10(c). When the display information "PERSONAL COMPUTER" is selected on the display unit 4 by the mouse 9 to carry out a process in the "FILE TRANSMISSION" mode, information corresponding to the display information "PERSONAL COMPUTER" is supplied to the personal computer 51' via the first and second interface circuit 6 and 54. After that, the display information in the personal computer 51' as shown in FIG. 11(a) is supplied from the display controller 56 of the personal computer 51' to the composite image forming unit 8, and the display information in the personal computer 51' is integrated with the display information in the video telephone equipment 1' as shown in FIG. 11(b) by the composite image forming unit 8. As a result, a composite image formed of the above display information in both the personal computer 51' and the video telephone equipment 1' is displayed on the display unit 4, as shown in FIG. 11(c). In this state, the mouse 9 can select any icons (display information) from all icons on the display unit 4.

When the "FILE TRANSMISSION" mode is selected by the mouse 9 on the display unit 4, information corresponding to the "FILE TRANSMISSION" mode is transmitted from the video telephone equipment 1' to the personal computer 51'. When the personal computer 51' recognizes that the "FILE TRANSMISSION" mode is selected, next display information as shown in FIG. 12 (a) is transmitted from the display controller 56 to the composite image forming unit 8. The composite image forming unit 8 outputs a composite image data formed with the display information in the personal computer 51' and the display information (shown in FIG. 12(b)) in the video telephone equipment 1'. As a result, the composite image is displayed on the display unit 4 as shown in FIG. 12(c).

In a state where the display unit 4 displays items as shown in FIG. 12(c), for example, an item "TEXT DATA" is selected by the mouse 9. The display information in the personal computer 51' is updated to that shown in FIG. 13(a), so that the updated display information and the display information (shown in FIG. 13 (b)) in the video telephone equipment 1' are integrated with each other. As a result, the composite image displayed on the display unit 4 is updated as shown in FIG. 13(c). After that, when an item "FILE TRANSMISSION" is selected from the items displayed on the display unit 4 by the mouse 9, the text file is supplied from the personal computer 51' to the video telephone equipment 1' via the second and first interface circuits 54 and 6 in accordance with the procedure described above (with reference to FIG. 9). Then the text file is transmitted from the communication unit 15 of the video telephone equipment 1' to the remote station.

After the text file is transmitted from the calling station to the remote station, the text file data is displayed on display units of the personal computers in the calling station and the remote station. In this state, audio signals and video signals are transmitted from the video telephone equipment in the calling station to that in the remote station and viceversa in the same manner as those in the conventional system. As a result, operators in the calling station and the remote station can have a conversation by use of the video telephone equipments while looking at the file data displayed on the display units of the personal computers.

When the conversation is completed, the text file of each of the personal computers is closed. Then, when an "OFF" operation is carried out, the video telephone equipment 1' is disconnected from the ISDN line.

According to the above first embodiment, the file data in the personal computer 51' can be transmitted from the video telephone equipment 1' in the calling station to that in the remote station. As a result, operators in the calling station and the remote station can have a conversation while looking the file data. In addition, a composite image formed on a display information in the personal computer 51' and in the video telephone equipment 1' is displayed on the display unit 4 of the video telephone equipment 1', so that items corresponding to operations in both the personal computer 51' and the video telephone equipment 1' can be simply selected by the mouse 9 on the display unit 4.

A description will now be given of a second embodiment of the present invention with reference to FIGS. 14 and 15.

Figure 14:
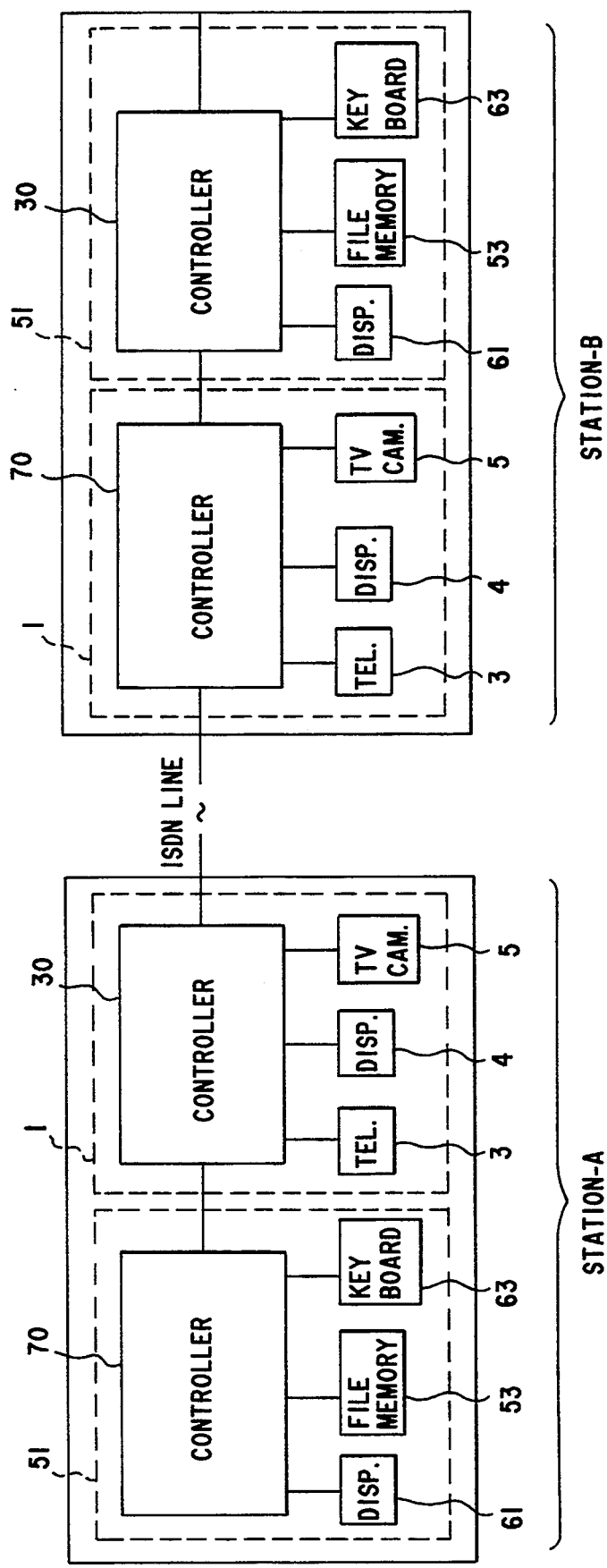
FIG. 14 is a block diagram illustrating a video telephone system according to a second embodiment of the present invention.

Referring to FIG. 14, each of stations A and B is provided with the video telephone equipment 1 and the personal computer 51. The video telephone equipment 1 has the controller 70 with a processor, the telephone unit 3, the display unit 4 and the TV camera unit 5, in the same manner as that in the first embodiment. The personal computer 51 has the file memory 53, a display unit 61 and a keyboard 63. The video telephone equipment 1 and the personal computer 51 are connected to each other. The video telephone equipment 1 in the station A is coupled to that in the station B by the ISDN line.

Figure 15:
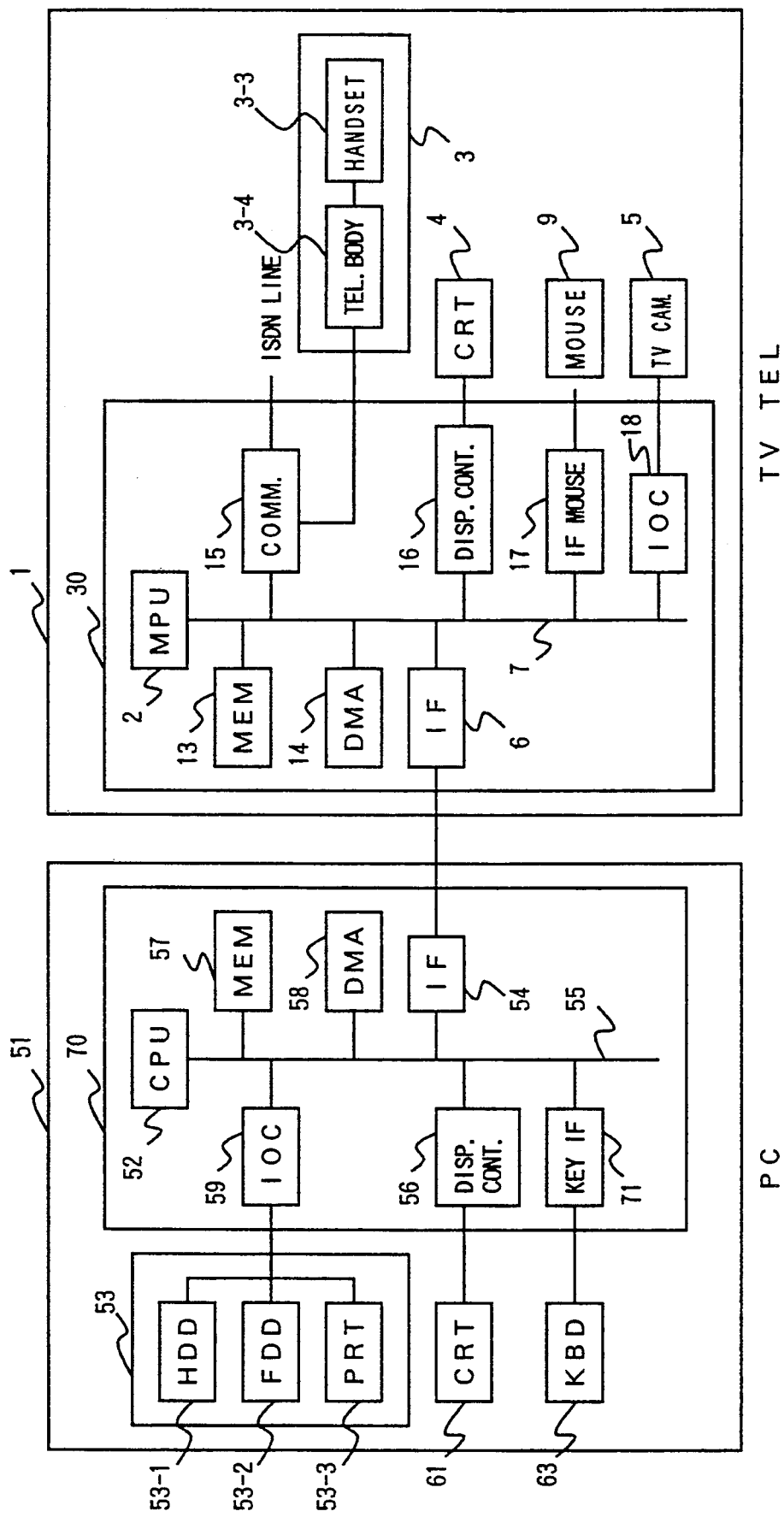
FIG. 15 is a block diagram illustrating a personal computer and a video telephone equipment provided in each station in the video telephone system shown in FIG. 14.

Detailed constructions of the video telephone equipment 1 and the personal computer 51 are indicated in FIG. 15.

Referring to FIG. 15, the controller 30 of the video telephone equipment 1 has the processor 2 (MPU), the first interface circuit 6, the memory 13, the DMA (Direct Memory Access) controller 14, the communication unit 15, the display control unit 16, the mouse interface circuit 17 and the input/output interface circuit 18 (IOC). These parts in the controller 30 are connected to each other by the processor bus 7. The communication unit 15 is further connected to the ISDN line and the telephone unit 3 comprising the handset 3-3 and the telephone body 3-4 so as to intermediate between the processor bus 7 and the ISDN line and between the telephone unit 3 and the ISDN line. The display unit 4 is connected to the display control unit 16, and the TV camera unit 5 is connected to the input/output interface circuit 18 (IOC). The mouse 9 is connected to the mouse interface circuit 17. The mouse 9 is used for operating only the video telephone equipment 1.

The controller 70 of the personal computer 51 has the processor 52, the second interface circuit 54, the display controller 56, the memory 57, the DMA controller 58, the input/output interface circuit 59 and a keyboard interface circuit 71 which are coupled to each other by the processor bus 55. The second interface circuit 54 is connected to the first interface circuit 6 of the video telephone equipment 1 so that various data is supplied from the personal computer 51 to the video telephone equipment 1 via the second and first interface circuit 54 and 6 and viceversa. The display controller 56 is connected to the display unit 61, and the keyboard interface circuit is connected to the keyboard 63. The file memory 53 is connected to the input/output interface circuit 59 and has a hard disk unit 53-1 (HDD), a floppy disk unit 53-2 (FDD) and a printer 53-3 (PRT).

When the video telephone equipment 1 calls a remote station by using the telephone unit 3, the ISDN line is connected to the telephone equipment 1 in the calling station (A or B) and that in the remote station (B or A). Then a text file is read out from the file memory 53 by operations of the keyboard 63 of the personal computer 51. The text file is transmitted from the personal computer 51 to the video telephone equipment 1 via the second and first interface circuit 54 and 6, in accordance with a transmission command input to the personal computer 51 by operations of the keyboard 63. In this case, a text file is transmitted in accordance with almost the same procedure as that indicated in FIG. 9. When the video telephone equipment 1 receives the text file, the text file is transmitted along with audio signals and video signals to the remote station in the same manner as those in the first embodiment. Instructions for transmitting the text file, the audio signals and the video signals to the remote station are supplied from the mouse 9 to the video telephone equipment 1.

According to the second embodiment, the file data is transmitted from the personal computer 51 to the video telephone equipment 1 by operation of the keyboard 63 of the personal computer 51 via the second and first interface circuits 54 and 6. Thus, when the file data is received by the video telephone equipment 1, the file data can be transmitted to the remote station via the ISDN line.

A description will now be given of the principle of another embodiment of the present invention with reference to FIG. 16.

Figure 16:
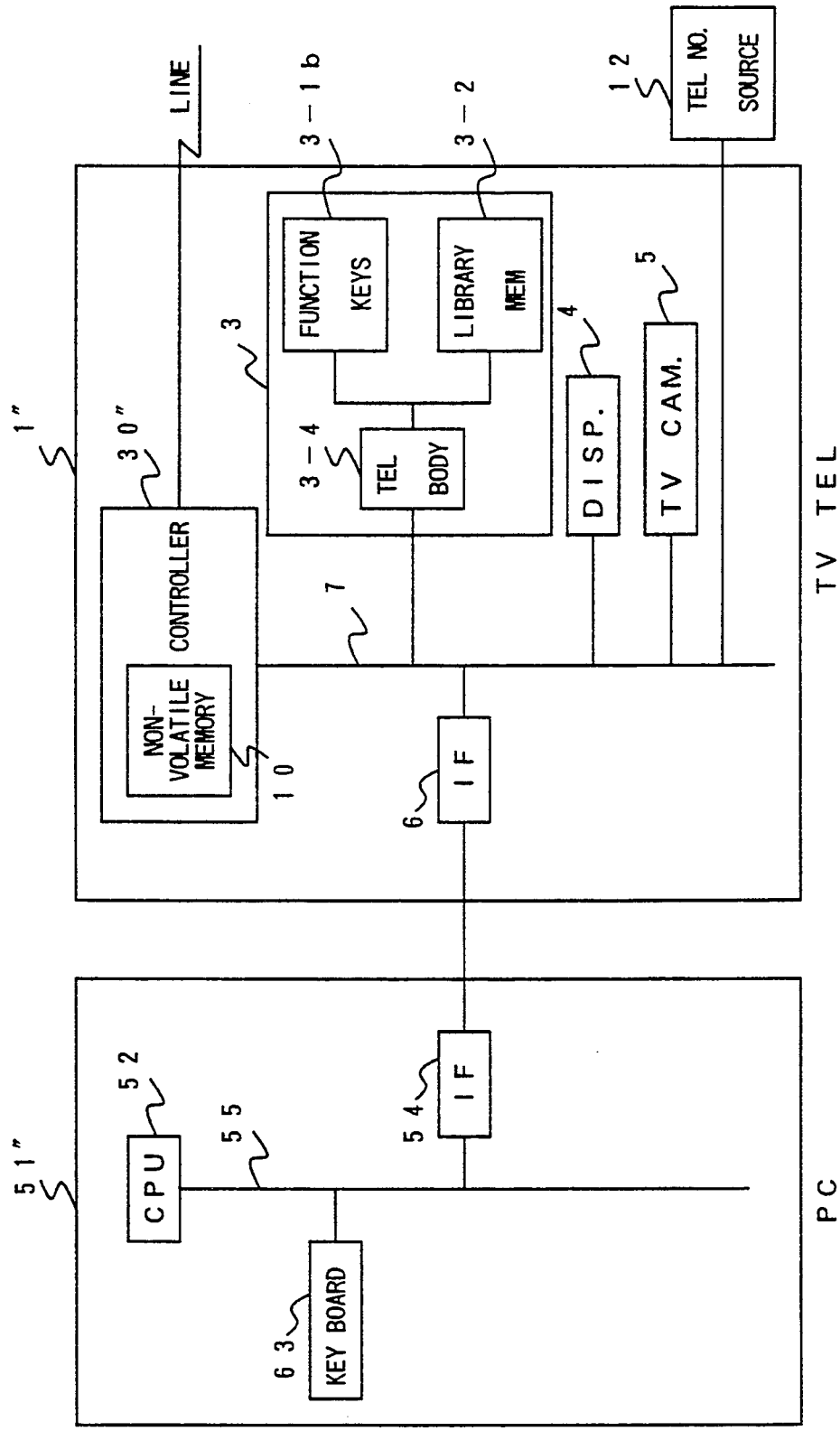
FIG. 16 is a block diagram illustrating a principle of another embodiment of the present invention.

Referring to FIG. 16, a video telephone equipment 1" (TV TEL) has a controller 30" with a processor, the telephone unit 3, the display unit 4, the TV camera unit 5 and the first interface circuit 6 which are connected to each other by the processor bus 7. The controller 30" is provided with a non-volatile memory 10. The telephone unit 3 has the telephone body 3-4, function keys 3-1b used for identifying remote stations and a library memory 3-2 for recording telephone numbers corresponding to the function keys 3-1b. The function keys 3-1b are referred to as a one-touch-dialing keys. A telephone number source unit 12 is detachably connected to the processor bus 7 so that the telephone numbers stored in the telephone number source unit 12 can be used in the video telephone equipment 1". The personal computer 51" has the processor 52 (CPU), the second interface circuit 54 and the keyboard 63 which are connected to each other by the processor bus 55. The first interface circuit 6 of the video telephone equipment 1" and the second interface circuit 54 of the personal computer 51" are connected to each other so that various data can be transmitted from the video telephone equipment 1" to the personal computer 51" and viceversa. The telephone number information supplied from the telephone number source unit 12 and the telephone number information corresponding to the one-touch-dialing keys 3-1b are stored in the non-volatile memory 10 in the controller 30" of the video telephone equipment 1". Instructions input from the keyboard 63 of the personal computer 51" is transmitted to the video telephone equipment 1" via the second and first interface circuits 54 and 6. The telephone number information stored in the non-volatile memory 10 is edited in accordance with the instruction input from the keyboard 63.

A description will now be given of a third embodiment of the present invention with reference to FIGS. 17 through 20.

Figure 17:
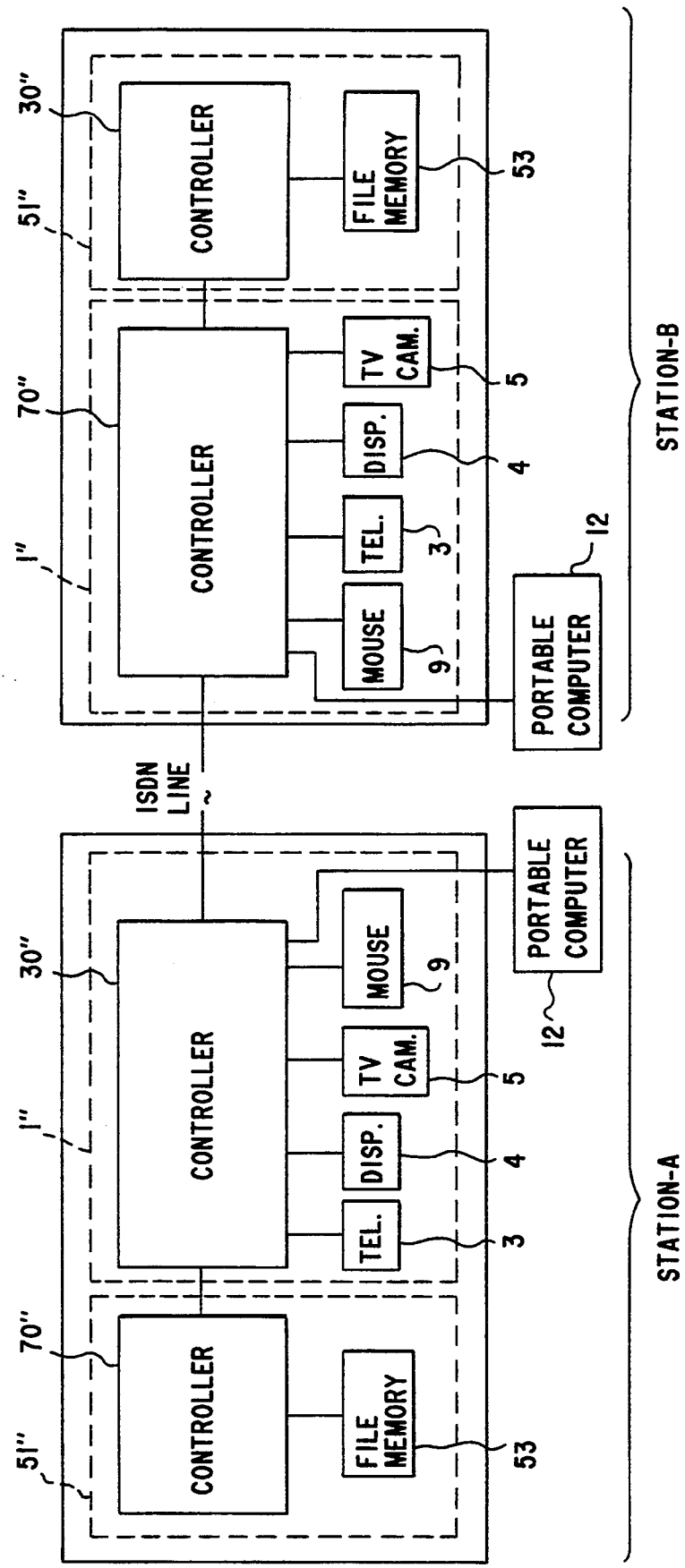
FIG. 17 is a block diagram illustrating a video telephone system according to a third embodiment of the present invention.

Referring to FIG. 17, each of the stations A and B is provided with the video telephone equipment 1" and the personal computer 51". The video telephone equipments 1" and 1" in the stations A and B are connected to each other by the ISDN line. The video telephone equipment 1" has the controller 30", the telephone unit 3, the display unit 4, the TV camera unit 5 and the mouse 9. The telephone unit 3, the display unit 4, the TV camera unit 5 and the mouse 9 are coupled to the controller 30" so as to be controlled by the controller 30". A portable computer 12 is detachably connected to the controller 30" of the video telephone equipment 1". The portable computer 12 has a storage for storing telephone number information. The personal computer 51" has the controller 70" and the file memory 53 connected to the controller 70". The controller 30" of the video telephone equipment 1" and the controller 70" of the personal computer 51" are operatively connected to each other so that various data are transmitted from the personal computer 51" to the video telephone equipment 1" and viceversa.

Figure 18:
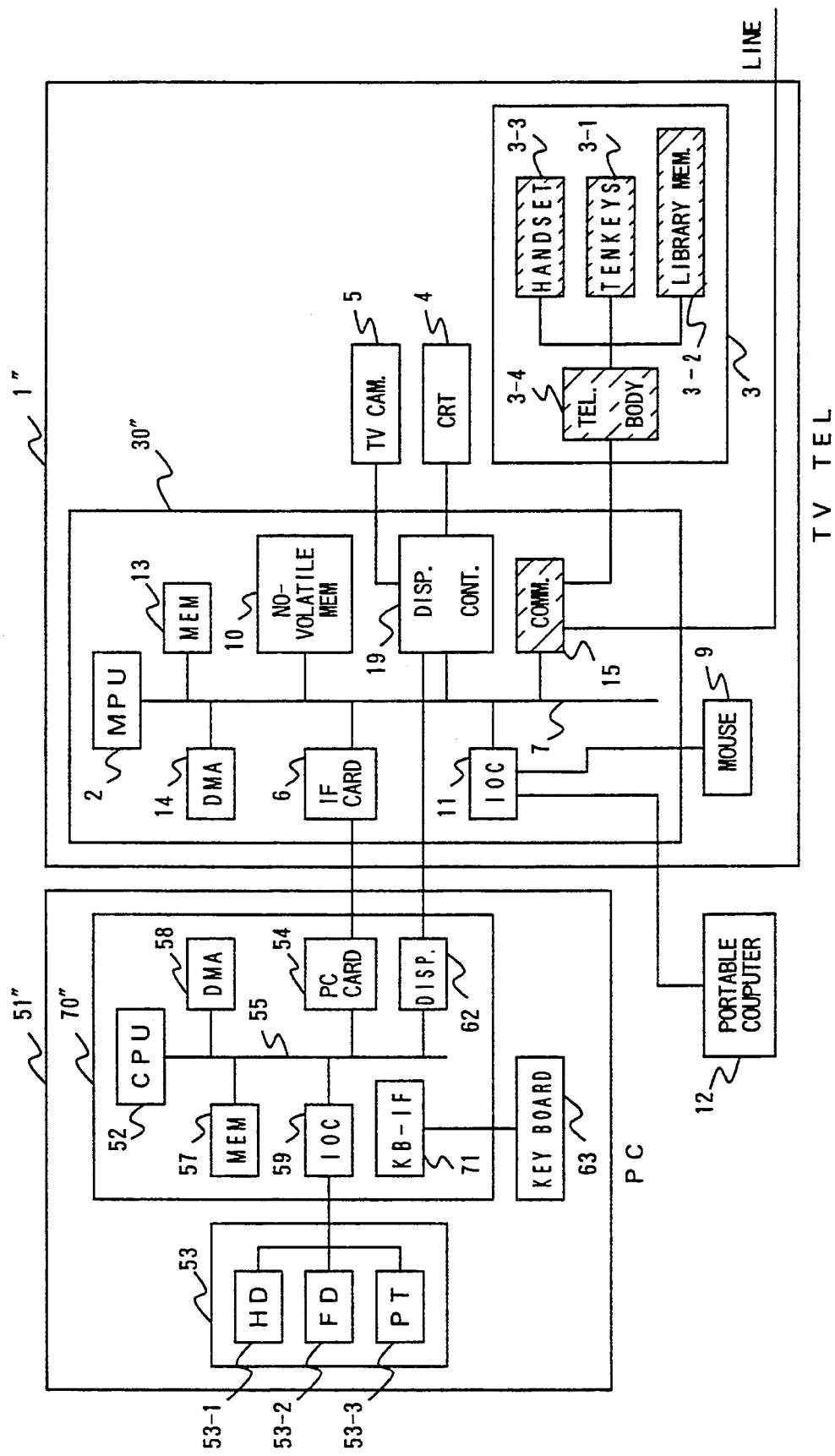
FIG. 18 is a block diagram illustrating a personal computer (PC) and a video telephone equipment (TV TEL) provided in each station in the video telephone system shown in FIG. 17.

Detailed constructions of the video telephone equipment 1" and the personal computer 51" are indicated in FIG. 18.

Referring to FIG. 18, the controller 30" of the video telephone equipment 1" has the processor 2 (MPU), the first interface circuit 6 formed on the IF card, the non-volatile memory 10, the input/output interface circuit 11, the memory 13, the DMA controller 14, the communication unit 15, and an image display controller 19 which are connected to each other by the processor bus 7. The display unit 4 and the TV camera unit 5 are connected to the display controller 19. The communication unit 15 is connected to the telephone unit 3 and the ISDN line so as to intermediate between the ISDN line and the telephone unit 3 and between the ISDN line and the processor bus 7. The telephone unit is formed of the handset 3-3, the telephone body 3-4, ten keys 3-1 and a library memory 3-2. The handset 3-3, the ten keys 3-1 and the library memory 3-2 are connected to the telephone body 3-4. The mouse 9 is connected to the input/output interface circuit 11, and the portable computer 12 is detachably connected to the input/output interface circuit 11.

The controller 70" of the personal computer 51" has the processor 52 (CPU), the second interface circuit 54 formed on the PC cooperating card, the memory 57, the DMA controller 58, the input/output interface circuit 59, an image controller 62 and the keyboard interface circuit 71 which are connected to each other by the processor bus 55. The keyboard 63 is connected to the keyboard interface circuit 71. The file memory 63 having the hard disk unit 53-1, the floppy disk unit 53-2 and the printer unit 53-3 is connected to the input/output interface circuit 59.

The first interface circuit 6 formed on the card in the video telephone equipment 1" and the second interface circuit 54 formed on the PC cooperating card in the personal computer 51" are connected to each other so that various data are transmitted from the personal computer 51" to the video telephone equipment 1" and viceversa. The image display controller 19 of the video telephone equipment 1" is connected to the image controller 62 of the personal computer 51". Image data processed in the personal computer 51" is transmitted from the image controller 62 to the image display controller 19 of the video telephone equipment 1". The image display controller 19 has functions of the display controller 16 and the composite image forming unit 8 described in the first embodiment (see FIG. 6). Thus, a composite image formed of the images processed in both the personal computer 51" and the video telephone equipment 1" can be displayed on the display unit 4 by the image display controller 19.

Figure 19:
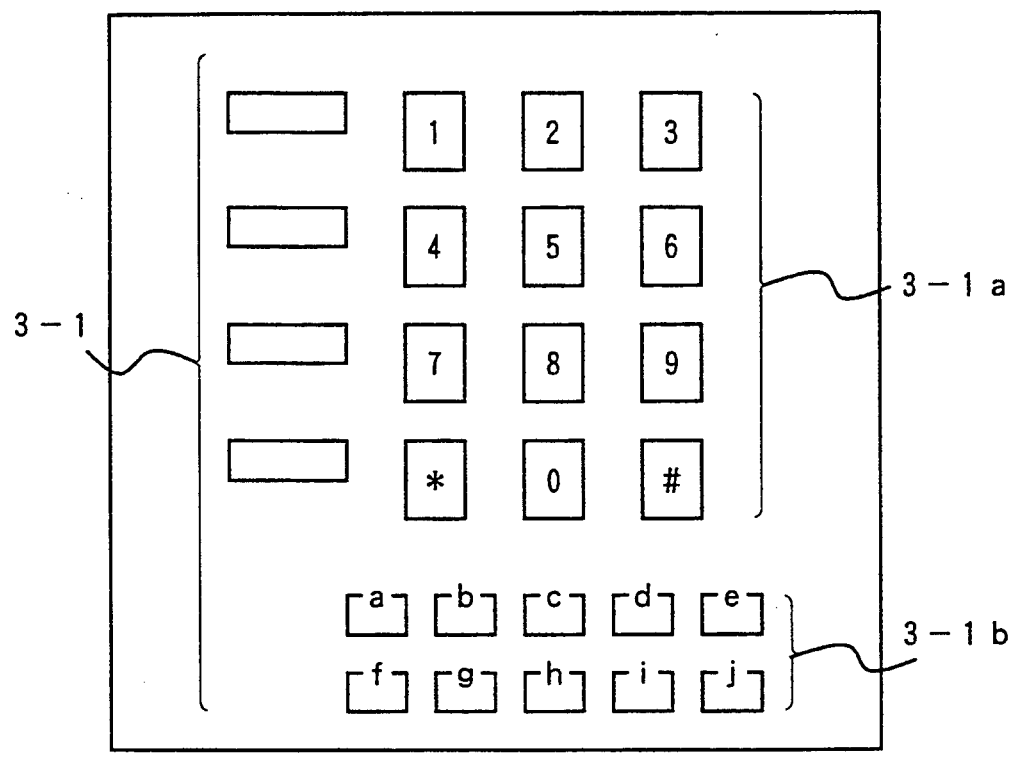
FIG. 19 is a diagram illustrating keys in the keyboard of the personal computer.

The ten keys 3-1 of the telephone unit 3 are formed of normal dialing keys 3-1a and function keys 3-1b referred to as one-touch-dialing keys, as shown in FIG. 19. Each of the function keys 3-1b corresponds to one of telephone numbers recorded in the library memory 3-2. The non-volatile memory 10 has a one-touch dialing key recording area 10-a for recording telephone numbers corresponding to the function keys 3-1b (the onetouch-dialing keys) and a normal dialing key recording area 10-b for recording normal telephone numbers, as shown in FIG. 20. When the portable computer 12 is connected to the controller 30" (the input/output interface circuit 11), telephone number information in the storage of the portable computer 12 is transmitted to the controller 30" and stored in the normal dialing key recording area 10-b of the non-volatile memory 10. Telephone number information input from the keyboard 63 of the personal computer 51" is transmitted to the video telephone equipment 1" via the second and first interface circuit 54 and 6 and stored in the normal dialing key recording area 10-b of the non-volatile memory 10. The one-touch-dialing key recording area 10-a of the non-volatile memory 10 is divided into a first area 10-a1 for recording names of remote stations identified by the function keys 3-1b, a second area 10-a2 for recording telephone numbers corresponding to the function keys 3-1b and a third area for recording comments to be transmitted to the remote stations identified by the function keys 3-1b. The normal dialing key recording area 10-b of the non-volatile memory 10 is also divided into a first area 10-b1 for recording names of remote stations identified by telephone numbers, a second area 10-b2 for recording the telephone numbers and a third area for recording comments to be transmitted to the remote stations identified by the telephone numbers.

The information recorded in the non-volatile memory 10 can be updated by use of the keyboard 63 of the personal computer 51". The instruction and updated information, which are input from the keyboard 63 to update the information in non-volatile memory 10, are transmitted from the personal computer 51" to the video telephone equipment 1" via the second and first interface circuit 54 and 6. When the information in the one-touch-dialing key recording area 10-a of the non-volatile memory 10 is updated, corresponding information in the library memory 3-2 of the telephone unit 3 is similarly updated. When the information in the storage of the portable computer 12 is updated, corresponding information in the normal dialing key recording area 10-b of the non-volatile memory 10 is similarly updated.

The ten key 3-1 is operated, and a telephone number corresponding to the operation of the ten key 3-1 is supplied to the communication unit 15 via the telephone body 3-4. In a case where one of the function keys 3-1b is operated, a telephone number corresponding to the operated one of the function keys 3-1b is supplied from the library memory 3-2 to the communication unit 15. The communication unit 15 calls a remote station identified by the telephone number supplied from the telephone unit 3. When the communication unit 15 is connected to that in the called remote station by the ISDN line, file data stored in the file 53 of the personal computer 51", video signals and audio signals are transmitted from the video telephone equipment 1" to that in the called remote station and viceversa, in the same manner as the cases in the first and second embodiments described above.

Even if a power supply to the video telephone equipment 1" is interrupted, the communication unit 15 and the telephone unit 3 which are marked by slant lines, an electric current is continuously supplied to the communication unit 15 and the telephone unit 3 via the line. Thus, even if the power supply to the video telephone equipment 1" is interrupted, an operator of the video telephone equipment 1" can communicate with another operator in a remote station by using telephone unit 3.

When the power supply to the video telephone equipment 1" is interrupted, a mode in which a telephone number can be selected from those in the=non-volatile memory 10 is activated.

A composite image formed of image information processed in the personal computer 51" and image information processed in the video telephone equipment 1" can be displayed on the display unit 4, in the same manner as that in a case of the first embodiment.

According to the third embodiment, the information input from the keyboard 63 is transmitted from the personal computer 51" to the video telephone equipment 1" via the second and first interface circuits 54 and 6. Thus, a telephone number input to the personal computer 51" can be stored in the non-volatile memory 10 of the video telephone equipment 1". In addition, the information in the portable computer 12 can be also supplied to the non-volatile memory 10 and stored in it.

The present invention is not limited to the aforementioned embodiments, and variations and modifications may be made without departing from the scope of the claimed invention.

What is claimed is:

1. A terminal system, comprising a video telephone equipment; and a computer system, wherein said video telephone equipment comprises:
   a communication unit connected to a line,
   a telephone unit for communicating with a remote station by speech via said communication unit and said line,
   a camera unit for taking pictures and outputting video signals corresponding to the pictures, said video signals being transmitted to the remote station via said communication unit and said line,
   a display unit for displaying images corresponding video signals, and
   a processor for controlling said communication unit, said telephone unit, said camera unit and said display unit,
   wherein said communication unit, said telephone unit, said camera unit, said display unit and said processor unit are coupled to each other by a first bus, wherein said computer system comprises:
   a processor, coupled to an external unit by a second bus, for processing data supplied thereto via said second bus, and wherein said terminal system comprises:
   interface means, coupled to said first and second buses, for intermediating between said video telephone equipment and said computer system so that data is transmitted from between said computer system and said video telephone equipment via said interface means.

2. A terminal system claimed in claim 1, wherein said interface means has a first interface circuit connected to said first bus and a second interface circuit connected to said second bus and said first interface circuit.

3. A terminal system claimed in claim 2, wherein said first interface circuit is formed on a first circuit board set in said video telephone equipment, and said second interface circuit is formed on a second circuit board set in said computer system.

4. A terminal system claimed in claim 1, wherein said external unit includes a file for storing file data, the file data being transmitted to said second bus in said video telephone equipment via said first bus and interface means, and said file data being supplied from said second bus to said communication unit, so that said file data is transmitted from said communication unit to the remote station along with the video signals via said line.

5. A terminal system claimed in claim 1, further comprising composite image forming means for forming a composite image composed of a first image obtained in said video telephone equipment and a second image obtained in said computer system, said composite image being supplied to said display unit of said video telephone equipment and displayed thereon.

6. A terminal system as claimed in claim 5, wherein said composite image forming means has first means for generating the second image in said computer system, and second means for integrating the second image generated by said first means with the first image obtained in the video telephone equipment so that the composite image is formed.

7. A terminal system as claimed in claim 5, wherein said video telephone equipment further comprises input means, coupled to said first bus of said video telephone equipment, for inputting data corresponding to items in the composite image displayed on said display unit, said data being transmitted to said computer system via said first bus and said interface means and processed in said computer system.

8. A terminal system as claimed in claim 7, wherein said input means has a mouse for selecting each of the items in the composite image displayed on said display unit.

9. A terminal system as claimed in claim 1, wherein said video telephone equipment further comprises non-volatile memory means, coupled to said first bus, for storing telephone numbers corresponding to remote stations, wherein said communication unit can call a remote station identified by each of the telephone numbers stored in said non-volatile memory means.

10. A terminal system as claimed in claim 9, wherein said telephone unit has function keys corresponding to remote stations and library memory means for recording telephone numbers identifying the remote stations, so that, when each of said function keys are operated, said communication unit calls a remote station identified by a telephone number corresponding to an operated function key, which is selected from the telephone numbers stored in said library memory means, and wherein said non-volatile memory means stores the telephone numbers corresponding to the function keys.

11. A terminal system as claimed in claim 9, further comprising a portable computer detachably coupled to said first bus of said video telephone equipment, said portable computer having a storage means for storing telephone numbers corresponding to remote stations, wherein, when said portable computer is set in said video telephone equipment so as to be coupled to said first bus, the telephone number stored in storage means of said portable computer is supplied to said non-volatile memory means via said first bus and stored therein.

* * * * *